United States Patent [19]

Yamaoka

[11] Patent Number: 5,370,456
[45] Date of Patent: Dec. 6, 1994

[54] CONTINUOUS KNEADING APPARATUS PROVIDED WITH ROTATABLE KNEADING MEMBERS AND FIXED KNEADING MEMBERS

[75] Inventor: Kishihiro Yamaoka, Nara, Japan

[73] Assignee: B H Kogyo Yugen Kaisha, Osaka, Japan

[21] Appl. No.: 917,365

[22] Filed: Jul. 23, 1992

[30] Foreign Application Priority Data

Jul. 29, 1991 [JP] Japan .................................. 3-188640

[51] Int. Cl.⁵ .......................... B29B 7/42; B01F 7/08
[52] U.S. Cl. ........................................ 366/80; 366/82; 366/89; 366/319; 366/323
[58] Field of Search ...................... 366/75, 79, 80-82, 366/88-91, 318, 319, 322-324; 425/205, 208, 209

[56] References Cited

U.S. PATENT DOCUMENTS

| | | | |
|---|---|---|---|
| 3,889,932 | 6/1975 | Brandis et al. | 366/82 |
| 4,067,553 | 1/1978 | Yamaoka . | |
| 4,408,887 | 10/1983 | Yamaoka . | |
| 5,129,729 | 7/1992 | Geyer | 366/89 X |
| 5,217,303 | 6/1993 | Geyer | 366/89 X |

FOREIGN PATENT DOCUMENTS 916255 1/1963 United Kingdom ................. 366/81

*Primary Examiner*—David A. Scherbel
*Assistant Examiner*—Charles Cooley
*Attorney, Agent, or Firm*—Fish & Richardson

[57] ABSTRACT

A kneading apparatus includes a plurality of rotatable discs mounted on a screw shaft disposed on a hollow cylinder and a plurality of fixed doughnut members mounted on an inner wall of the hollow cylinder. The rotatable discs and fixed doughnut members are arranged alternately in an extending direction of the screw shaft. Projected portions and recessed portions extending radially and alternately arranged in a circumferential direction are formed on opposing side faces of the rotatable disc and fixed doughnut members in such a manner that the depths thereof are increased in proportion to the distance from a center of the screw shaft. Accordingly, the kneading apparatus is allowed to have a small construction and yet capable of efficiently kneading the material. In addition, material is prevented from remaining locally in the apparatus, and thereby a proper shear force is applied to the entire material.

5 Claims, 6 Drawing Sheets

CONTINUOUS KNEADING APPARATUS PROVIDED WITH ROTATABLE KNEADING MEMBERS AND FIXED KNEADING MEMBERS

BACKGROUND OF THE INVENTION

This invention relates to a continuous kneading apparatus capable of kneading a variety of material and having a small construction.

Conventionally, there have been known continuous kneading apparatus having the following construction. A feed section and a kneading section are formed such that material fed through a supply port into a cylinder provided with a rotatable screw shaft therein is continuously kneaded while being fed according to rotation of the screw shaft, and then extruded. Further, there has been disclosed a continuous kneading apparatus having a small construction, and yet capable of carrying out sufficient kneading. Such a continuous kneading apparatus is disclosed in, for example, Examined Japanese Patent Publication No. 2-92. In this apparatus, fixed doughnut members mounted on a cylinder and rotatable discs mounted on a rotatable shaft are alternately opposed to each other, and projected portions and recessed portions extending in radial directions are formed on opposing side faces of the rotatable discs and fixed doughnut members. With this arrangement, the shear force is applied to the material while the material is passing between the rotatable discs and fixed doughnut members.

In the latter apparatus, the material is subjected to the shear force while being fed radially outwards from center portions of the rotatable disc or being fed radially inwards from the outer portions thereof. Accordingly, the magnitude of the shear force acting on the material differs in a region close to the center portion and a region away therefrom based on a difference in the relative speed of the rotatable discs and fixed doughnut members in a circumferential direction. Thus, the material is caused to remain locally, and therefore this apparatus suffers the problem that a proper shear force cannot be applied to the entire material. More specifically, the shearing stress $\tau$ (kgf/cm) acting on the material can be expressed in the following equation.

$$\tau = \eta \nu / t$$

where $\eta$ denotes viscosity (poise);
$\nu$ denotes shear rate (cm/s); and
t denotes thickness of a shear layer.

In the above equation, the shear rate $\nu$ is proportion to the relative speed of the rotatable discs and fixed doughnut members. Since the thickness of the shear layer is normally fixed, the shearing stress $\tau$ varies in proportion to the above relative speed. Accordingly, the proper shear force cannot be applied to the entire material.

SUMMARY OF THE INVENTION

It is an object of the invention to overcome the foregoing problems in the prior art and to provide a continuous kneading apparatus which has a small construction and yet is capable of kneading (compressing and shearing) material efficiently, and of applying a proper shear force to the entire material by preventing the material from locally remaining in the kneading apparatus.

Accordingly, a kneading apparatus of the invention comprises a cylinder, a rotatable shaft disposed in the cylinder, the rotatable shaft having a helical thread defined on an outer circumferential surface thereof so as to feed fluid material in an extending direction thereof, a plurality of rotatable discs each mounted on the rotatable shaft, and a plurality of fixed members in the form of doughnut mounted on an inner wall of the cylinder coaxially with the rotatable discs. The plurality of rotatable discs and fixed members are arranged alternately in the extending direction of the rotatable shaft so that the side faces of the rotatable discs oppose the corresponding side faces of the fixed members. Projected portions and recessed portions are formed on opposite side faces of the rotatable discs and fixed members, the projected portions and recessed portions extending radially and arranged alternately in a circumferential direction on each side face. The projected portions and recessed portions of the rotatable discs and fixed members are formed such that the distance between the opposing rotatable discs and fixed members along the extending direction of the rotatable shaft is increased in proportion to the distance from a center of a rotatable shaft.

With the kneading apparatus thus constructed, a shear force produced by relative rotation of the rotatable discs and fixed members is applied uniformly to the entire material between the rotatable disc and fixed members, thereby preventing the material from remaining in the apparatus.

As means to increase the distance between the opposing rotatable discs and fixed members, the recessed portions formed on either the rotatable discs or fixed doughnut members, or recessed portions formed on both the rotatable discs and fixed doughnut members may be formed such that the depth thereof is increased in proportion to the distance from a center of the rotatable shaft.

Further, boundary lines between two adjacent projected portions and recessed portions formed on one and the other side faces of the rotatable discs may be formed to extend in such directions that the material fed between one side faces of the rotatable discs and fixed members is fed radially outwards, and then fed radially inwards between the other side faces of the rotatable discs and next fixed members through space between outer circumferential surfaces of the rotatable discs and the inner wall of the cylinder.

These and other objects, features and advantages of the present invention will become more apparent upon a reading of the following detailed description and accompanying drawings.

DESCRIPTION OF PREFERRED EMBODIMENTS

Figure 1:
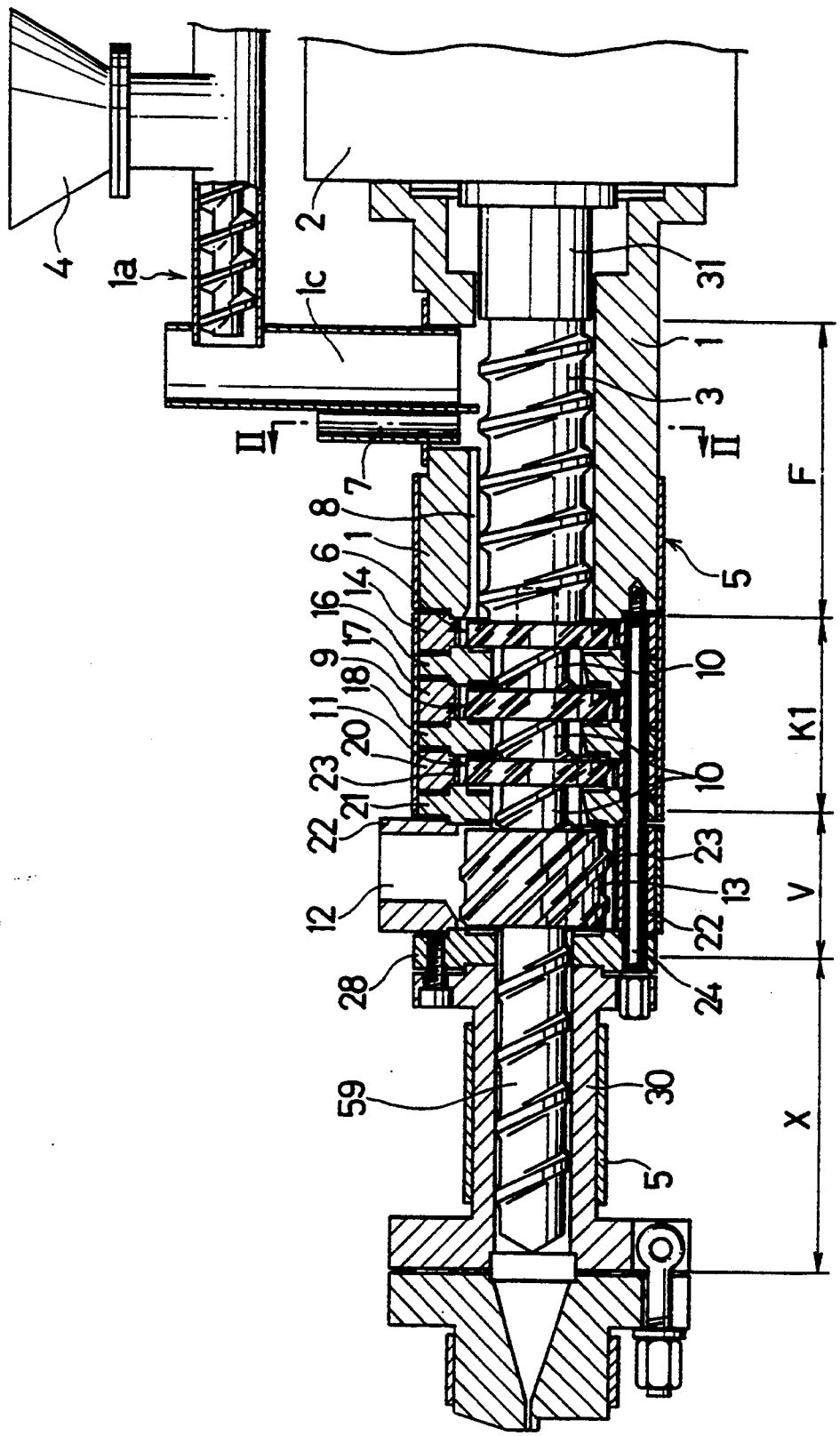
FIG. 1 is a vertical sectional view showing a center portion of a kneading apparatus embodying the invention.

FIG. 1 is a vertical sectional view showing a center portion of a kneading apparatus embodying the invention. In this figure, indicated at 1 is a cylinder. To the cylinder 1 is connected a hopper 4 by way of a supply port 1c and a quantity measuring feeder 1a. A rotatable shaft 31 which is rotated by a driving device 2 is inserted in cylinder 1. Threads are formed on the rotatable shaft 31 almost entirely from a base end up to a forward end thereof. A thread 3 formed on the base end portion of the shaft 31 and another thread 59 formed on the forward end portion thereof constitute a feeding section F and an extruding section X respectively. Notatable discs 6, 9, and 11 are disposed at specified intervals between the feeding section F and extruding section X. Further, another rotatable disc 13 having a width larger than that of the discs 6, 9, and 11 is disposed between the disc 11 and the extruding section X. The rotatable discs 6, 9, and 11 constitutes a kneading section K1 and the rotatable disc 13 constitutes a venting section V. Threads 10 are formed on the shaft 31 between these rotatable discs 6, 9, 11, and 13.

Figure 2:
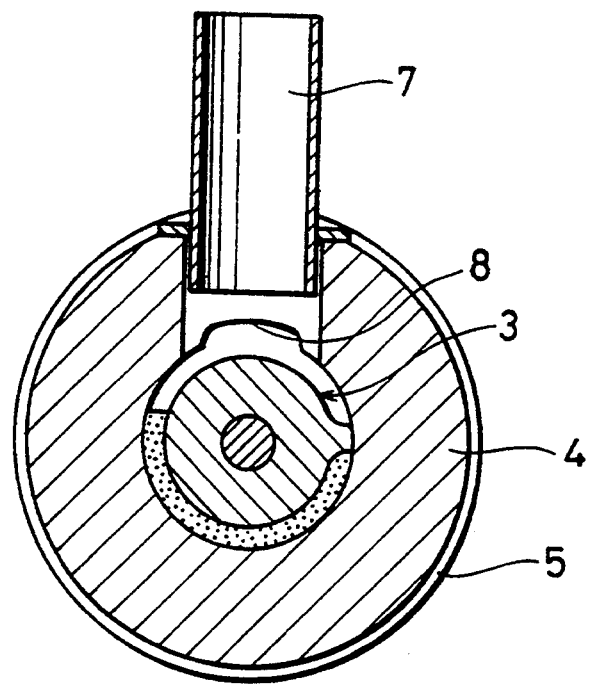
FIG. 2 is a sectional view taken along the line II—II in FIG. 1.

Between the hollow cylinder 1 at a base portion and a hollow cylinder 30 at a forward end are provided annular members 14, 17, and 20 corresponding to the rotatable discs 6, 9, and 11, fixed doughnut members 16, 18, and 21 disposed between the discs 6, 9, and 11, annular member 22 having a vent hole 12, and fixed doughnut member 28 disposed down stream of the member 22 with respect to a direction of feed of material. These members are integrally joined between the hollow cylinders 1 and 30 in the above described order by a tie rod 24, and constitute a joined hollow cylinder. On outer circumferential surfaces of the hollow cylinders are disposed heaters 5. In an upper portion of the inside of the hollow cylinder is defined a groove 8 extending continuously in a shaft direction. An upstream end of groove 8 is in communication with a vent hole 7 opening outwards as shown in FIG. 2.

Figure 3A:
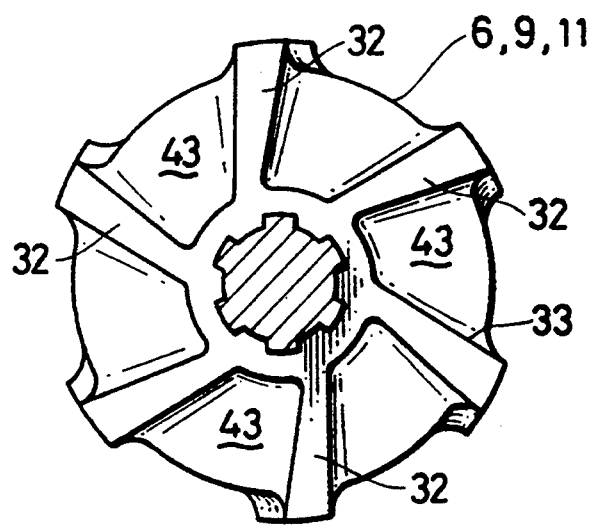
FIGS. 3a–3b are front and rear views showing a rotatable disc.
Figure 3B:
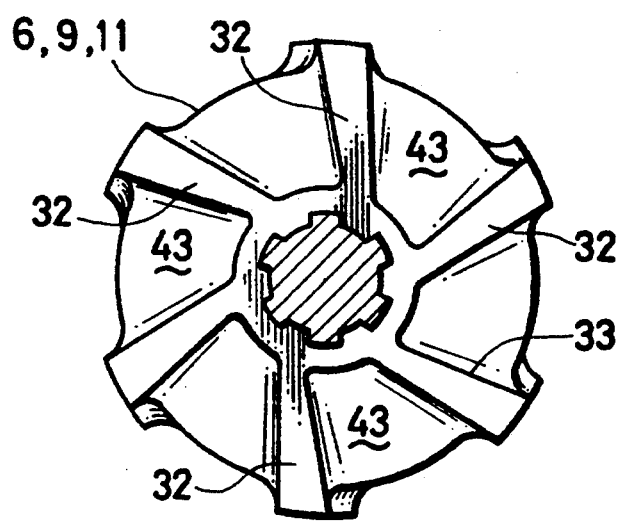
Figure 5:
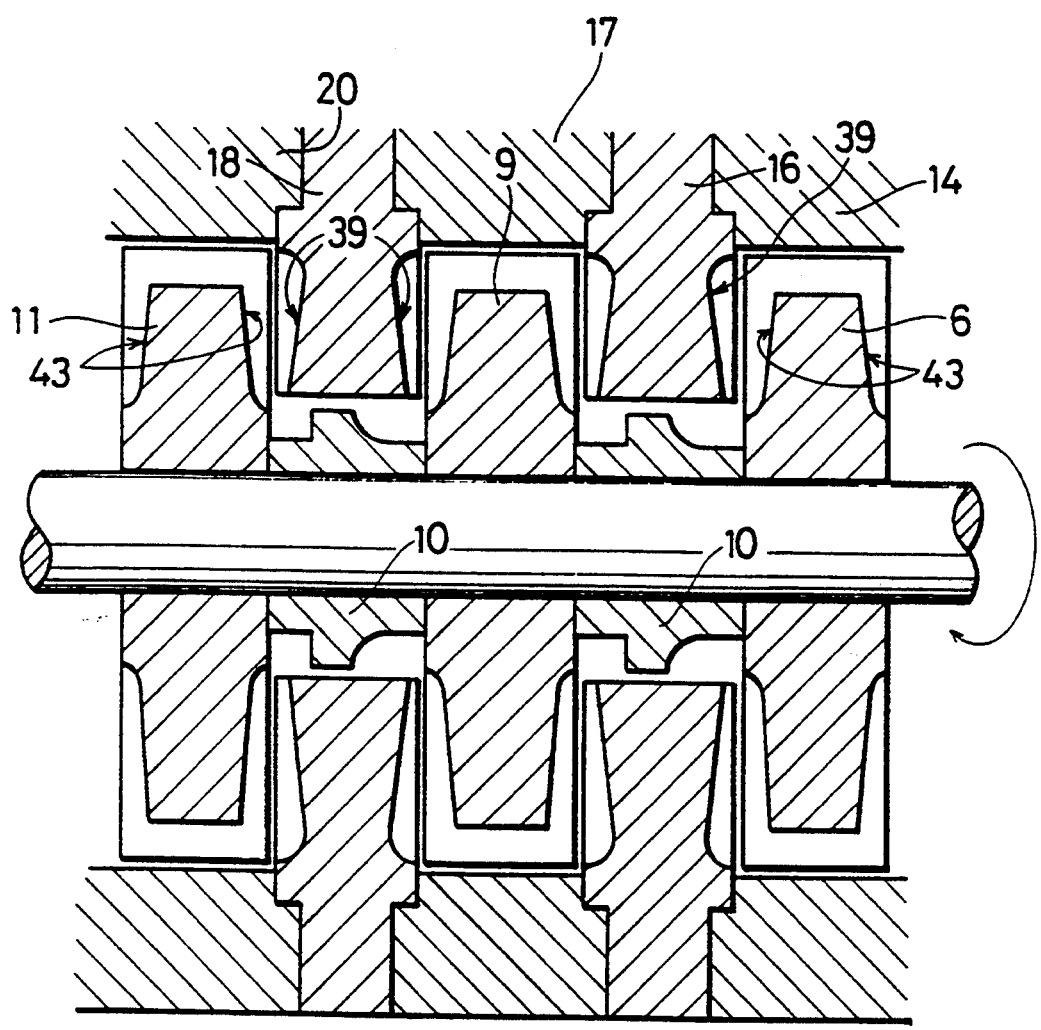
FIG. 5 is an enlarged sectional view showing a kneading unit shown in FIG. 1.

As shown in FIGS. 3a, 3b, and 5, a plurality of projected portions 32 are formed on opposite side faces of the rotatable discs 6, 9, and 11. On each of the side faces of the discs 6, 9, and 11, the projected portions 32 extend radially from its centers and equally and circumferentially spaced apart. Between two adjacent projected portions 32 is formed a recessed portion 43. The projected portion 32 and the recessed portion 43 are defined by a boundary line 33. The recessed portion 43 is formed such that the depth thereof is shallower at the center than at a radially outer portion of the rotatable disc. Outer radial ends of the projected portions 32 project radially outwardly of the outer circumferential ends of the rotatable discs 6, 9, and 11, and extend spirally in the shaft direction, thereby forming threads on the outer circumferential surfaces of the discs 6, 9, and 11. On inner circumferential surfaces of the annular members 14, 17, and 20 opposing the outer circumferential surfaces of the rotatable discs 6, 9, and 11 are formed grooves 23 extending in the shaft direction.

Figure 4:
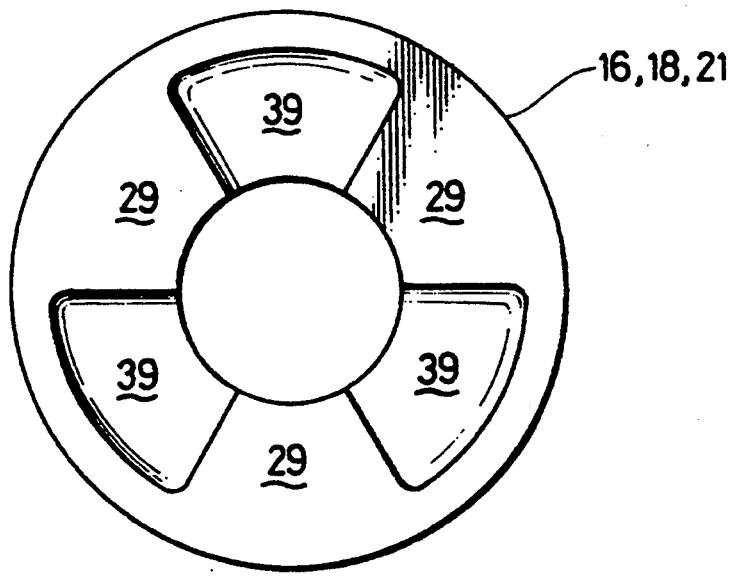
FIG. 4 is a front view showing a fixed doughnut member.

As shown in FIGS. 4 and 5, three recessed portions 39 are formed on each of side faces of the fixed doughnut members 16, 18, and 21 opposing the respective rotatable discs 6, 9, and 11 with the recessed portions equally and circumferentially spaced apart. Between two adjacent recessed portions 39 is formed a projected portion 29. The recessed portion 39 is formed such that the depth thereof is shallower at the center than at an radially outer portion of the fixed doughnut member. The projected portions 32 formed on the respective rotatable discs extend radially outwards with slight tilting. Specifically, the projected portions 32 formed on the side face of the rotatable discs facing an inlet side of the kneading apparatus extend in such a direction as to tilt relative to the radial directions thereof more in a direction of rotation at the radially outer portions. On the other hand, the projected portions 32 formed on the side face of the rotatable discs facing an outlet side of the kneading apparatus extend in such a direction as to tilt relative to the radial directions thereof more in a direction reverse of the direction of rotation at the radially outer portions. With these rotatable discs thus formed, material fed into the kneading apparatus is fed through space between the thread 3 and hollow cylinder 1 and along the inlet facing side face of the rotatable disc 6 in a radially outward direction. After passing over the outer circumferential surface of the rotatable disc 6, the material is further fed through space between the outlet facing side face of the rotatable disc 6 and the fixed doughnut member 14 in a radially inward direction. The material is further fed between the rotatable discs 9, 11 and the fixed doughnut members 14, 17 in the similar manner. Opposite side faces of the rotatable disc 13 and fixed doughnut member 28 are formed similarly to those of other rotatable discs and fixed doughnut members.

The rotatable discs and fixed doughnut members may be arranged in such a manner that an area defined therebetween, i.e. a flow passage area of material, becomes smaller at a downstream portion of the kneading apparatus. To this end, the rotatable disc and fixed doughnut members may be formed with an increased number of the projected portions or shallower recessed portions at the downstream portion of the kneading apparatus. Further, it may be appropriate to set an optimum number of the rotational disc and fixed doughnut members to be arranged or to determine the optimum number and shape of projected portions and recessed portions formed thereon according to material to be kneaded and kneading conditions.

Figure 7:
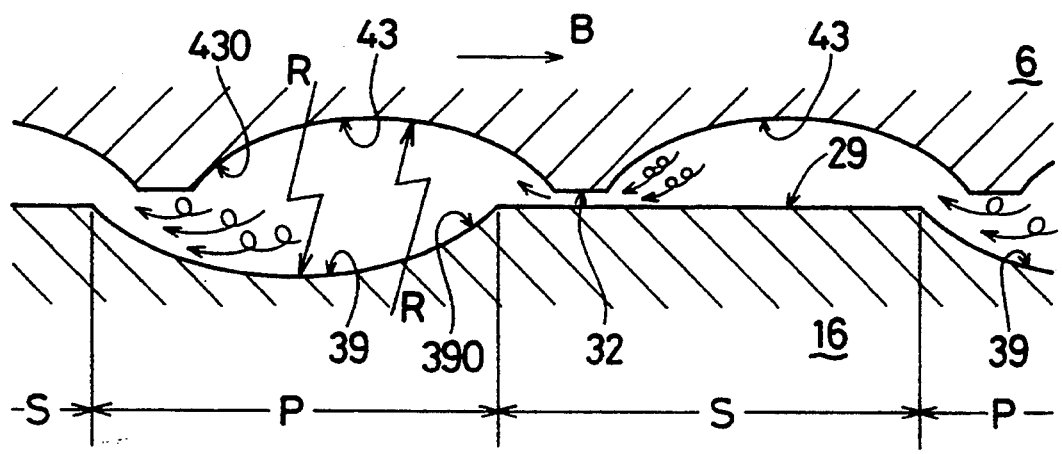
FIG. 7 is a partial sectional view enlargedly showing the kneading process shown in FIG. 6.
Figure 8:
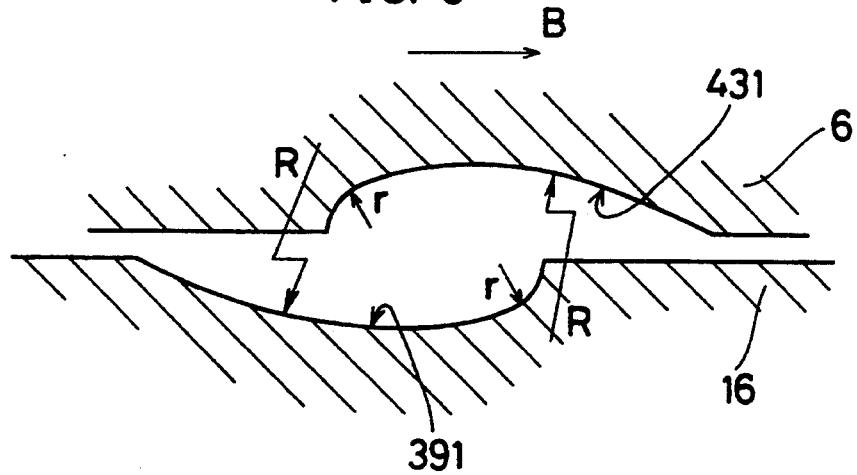
FIG. 8 is a an enlarged partial sectional view showing recessed portions of a modified shape.

Further, a plurality of grooves 23 extending in the shaft direction are formed on inner circumferential surfaces of the annular members 14, 17, and 20. The annular members and rotatable discs are arranged such that the inner circumferential surfaces of the annular members oppose the outer circumferential surfaces of the rotatable discs. Accordingly, the projected portions and recessed portions formed on the circumferential surfaces of the annular members and rotatable discs are alternately opposed to each other similarly to the arrangement of the projected portions and recessed portions formed on the side faces of the rotatable discs and fixed doughnut members. The outer circumferential surface of the rotatable disc 13 and the inner circumferential surface of the annular member 22 are formed similarly to those of other rotatable discs and annular members. The cross-sections of the recessed portions 39 and 43 are variously changeable in shape although FIG. 7 illustrates those formed with a fixed radius of curvature R. For instance, as shown in FIG. 8, it may be appropriate to form recessed portions 391 and 431 whose cross-sections are formed with a combination of a larger radius of curvature R and a smaller radius of curvature r. Such recessed portions may be formed in such a manner that rear walls thereof, with respect to a material feeding direction, have the smaller radius of curvature r. The recessed portions thus formed will serve to strongly compress the material being fed.

Next, operations of this kneading apparatus will be described. Firstly, the rotatable shaft 31 is rotated by the driving device 2 and the quantity measuring feeder 1a is actuated to feed material form the hopper 4 into the hollow cylinder 1 by a specified amount. Since the inside of the hollow cylinder i is heated by the heater 5, the material fed into it dries as they are fed towards the rotatable disc 6. Gases produced during this time are discharged through the groove 8 and vent hole 7. The material reaching the rotatable disc 6 is fed through the space between the outer circumferential surface of the disc 6 and inner circumferential surface of the annular member 14, and then fed radially inwards by relative movement of the opposing side faces of the disc and fixed doughnut member 16. The material is then fed to a more downstream side by the thread 10 through the space between the inner circumferential surface of the fixed doughnut member 16 and an outer circumferential surface of the thread 10, and further fed radially outwards through the space between opposing side faces of the rotatable disc 9 and fixed doughnut member 16. Thereafter, the material is subjected to the compressive action and shearing action while being fed between the rotatable discs and fixed doughnut members in the same manner.

Figure 6:
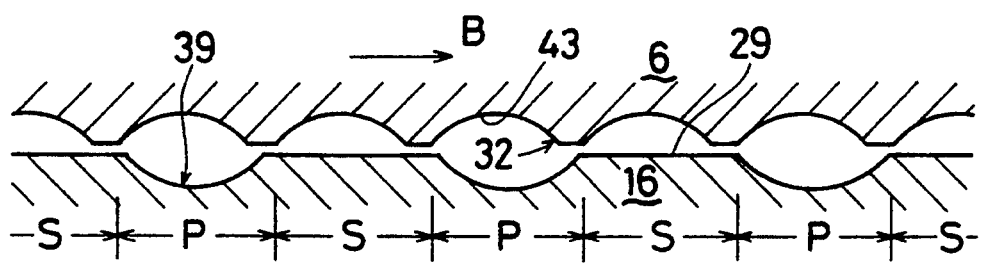
FIG. 6 is a partial sectional view showing a kneading process.

As shown in FIGS. 6 and 7, the passage for the material is formed such that the width thereof, i.e. the distance between the rotatable disc and fixed doughnut member, is wide in regions where the recessed portions 43 are opposing to the recessed portions 39, is slightly narrow in regions where the recessed portions 43 are opposing to the projected portions 29, and is very narrow in regions where the projected portions 29 are opposing to the projected portions 32. Accordingly, when the rotatable disc is rotated in an arrow direction B, rear walls 390 and 430 of the respective recessed portions 39 and 43 come closer to each other, reducing the distance defined between them. As a result, the material held between the rear walls 390 and 430 is subjected to the strong compressive action. The material subjected to the compressive action is pushed out to the space between the recessed portion 43 and projected portion 29, and pushed into the space between the projected portions 32 and 29, thereby becoming subjected to strong shearing action. These actions are carried out in a similar manner along a circumferential direction of the rotatable discs and fixed doughnut member. In other words, a compression process P and a shearing process S are alternately repeated in the circumferential direction. The magnitude of the compressive and shearing actions is in proportion to a relative speed of the rotatable discs and fixed doughnut members in the circumferential direction, and this relative speed is in proportion to the distance from a center rotation. In view of this, provided that the depth of the recessed portions is fixed, i.e. the volume of the recessed portions is fixed, the following can be said. The closer to the center of rotation, the smaller the magnitude of the compressive and shearing actions. Thus, the material is more likely to remain in regions closer to the center of rotation. However, in the above construction, the depth of the projected portions formed on the rotatable discs and fixed doughnut members is increased in proportion to the distance from the center of rotation. Accordingly, the magnitude of the compressive and shearing actions is maintained substantially fixed over a range between the center regions and outer circumferential regions of the rotatable discs. Thus, the kneading apparatus of the invention is free from the problem that the material remains in the regions close to the center of rotation where the relative speed of the rotatable discs and fixed doughnut members is slow.

Concerning the radial directions of the rotatable discs and fixed doughnut members, the projected portions 32 of the rotatable discs extend slantingly with respect to the radial directions thereof as described above. The projected portions 32 on one side faces of the rotatable discs are formed so as to gradually oppose the projected portions 29 as they extend radially outwards from the centers of the rotatable discs. Accordingly, when the force working in the circumferential direction is applied to the material, the force working in the radial direction acts on the material at the same time, and thereby the material is fed radially outwards. The projected portions 32 on the other side faces of the rotatable discs are slanting with respect to the radial directions thereof in a direction reverse of the slating direction of the former projected portions 32, and thereby the material is fed radially inwards.

As described above, the projected portions and recessed portions formed on the rotatable discs and fixed doughnut members are formed in such a manner that the distance of the space defined between the rotatable discs and fixed doughnut members opposing to each other along the extending direction of the screw shaft is increased in proportion to the radial distance from the center of the screw shaft. Accordingly, the shear force acting on the material is not to vary in the regions close to the screw shaft and away therefrom depending upon the difference in the relative speed in the circumferential direction between the rotatable discs and fixed doughnut members. Therefore, the compressive and shearing actions are carried out uniformly entirely between the rotatable discs and fixed doughnut members, thereby preventing the material from remaining locally in the kneading apparatus.

Although water or the like contained in the material is gasified during the kneading process, the produced gas is discharged through the vent hole 12 while passing through the outer circumferential portions of the rotatable disc 13. The material having the gas present therein completely extracted while passing through the disc 13 is fed through the extruding section X, and consequently extruded from a leading end portion of the extruding section X. In the foregoing embodiment, both recessed portions on the rotatable discs and fixed doughnut members are formed so that the depth thereof is increased in proportion to the distance from the center of rotation. However, it may be appropriate to regulate the depth of the recessed portions on only either the rotatable discs or fixed doughnut members in such a manner that the space defined between the recessed portions of the opposing rotatable disc and fixed doughnut member is increased in proportion to the distance from the center of rotation.

As described above, in accordance with the invention, projected portions and recessed portions are formed on opposing side faces of rotatable discs and fixed doughnut members, thereby enabling efficient kneading of material in a small construction. Further, in the above construction, the recessed portions are formed in such a manner that the depth thereof is increased in proportion to a distance from a center of rotation. Accordingly, compressive and shearing actions can be given to the material uniformly entirely, and therefore it can be reliably prevented that the material locally remain in the kneading apparatus.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A kneading apparatus comprising:
   a hollow cylinder;
   a rotatable shaft disposed in the hollow cylinder, the rotatable shaft having a helical thread defined on an outer circumferential surface thereof so as to feed fluid material in an extending direction thereof;
   a plurality of rotatable discs each mounted on the rotatable shaft and having projected portions and recessed portions formed on side faces thereof, the projected portions and recessed portions extending radially and arranged alternately in circumferential direction of the rotatable disc;
   a plurality of fixed members in the form of a doughnut mounted on an inner wall of the hollow cylinder coaxially with the rotatable discs and arranged alternately with the rotatable discs in the extending direction of the rotatable shaft so that side faces of the fixed members oppose the corresponding side faces of the rotatable discs, each fixed member having projected portions and recessed portions formed on the side faces thereof, the projected portions and recessed portions extending radially and arranged alternately in a circumferential direction of the fixed member; and
   the recessed portions of the rotatable discs and fixed members being formed such that the distance between the opposing rotatable discs and fixed members along the extending direction of the rotatable shaft is increased in proportion to a distance from a center of the rotatable shaft.

2. A kneading apparatus as defined in claim 1 wherein the recessed portions formed on one of the rotatable discs and the fixed doughnut members are formed such that the depth of each recessed portion is increased in proportion to the distance from the center of the rotatable shaft.

3. A kneading apparatus as defined in claim 1 wherein the recessed portions formed both on the rotatable discs and fixed doughnut members are formed such that the depth of each recessed portion is increased in proportion to the distance from the center of the rotatable shaft.

4. A kneading apparatus as defined in claim 1 wherein boundary lines between adjacent projected portions and recessed portions formed on the side faces of the rotatable discs extend in such directions that the material fed between one side face of the rotatable discs and fixed members is fed radially outwards, and then fed radially inwards between the other side face of the rotatable discs and next fixed members through a space between outer circumferential surfaces of the rotatable discs and the inner wall of the hollow cylinder.

5. A kneading apparatus as defined in claim 4 wherein the boundary lines formed on the one side face of the rotatable discs extend tiltingly from the radial directions of the rotatable discs in a direction of rotation, and the boundary lines formed on the other side face of the rotatable discs extend tiltingly from the radial directions of the rotatable discs in a direction reverse of the direction of rotation.

* * * * *